(12) United States Patent
Coos

(10) Patent No.: US 8,341,801 B2
(45) Date of Patent: Jan. 1, 2013

(54) WINDSCREEN WIPER DEVICE

(75) Inventor: Eric Coos, Cheniere (FR)

(73) Assignee: Federal-Mogul S.A., Aubange (BE)

( * ) Notice: Subject to any disclaimer, the term of this patent is extended or adjusted under 35 U.S.C. 154(b) by 762 days.

(21) Appl. No.: 12/301,561

(22) PCT Filed: May 14, 2007

(86) PCT No.: PCT/EP2007/054638
§ 371 (c)(1),
(2), (4) Date: Oct. 1, 2009

(87) PCT Pub. No.: WO2007/135009
PCT Pub. Date: Nov. 29, 2007

(65) Prior Publication Data
US 2010/0058552 A1    Mar. 11, 2010

(30) Foreign Application Priority Data
May 19, 2006 (EP) ..................................... 06114285

(51) Int. Cl.
*B60S 1/38* (2006.01)
(52) U.S. Cl. ........... 15/250.43; 15/250.201; 15/250.451; 15/250.452; 29/428
(58) Field of Classification Search ............... 15/250.43, 15/250.44, 250.201, 250.451–250.454, 250.361; 29/428
See application file for complete search history.

(56) References Cited

U.S. PATENT DOCUMENTS

| 2,907,065 A | | 10/1959 | Macpherson | |
| 3,153,254 A | * | 10/1964 | Lenz et al. | ................ 15/250.454 |
| 3,233,273 A | * | 2/1966 | Anderson | ................ 15/250.452 |
| 8,196,252 B2 | * | 6/2012 | Henin | ...................... 15/250.201 |

FOREIGN PATENT DOCUMENTS

| EP | 1491416 A | 12/2004 |
| FR | 2635495 A | 2/1990 |
| GB | 1 151 946 A | 5/1969 |

* cited by examiner

*Primary Examiner* — Gary Graham
(74) *Attorney, Agent, or Firm* — Robert L. Stearns; Dickinson Wright, PLLC

(57) ABSTRACT

A windscreen wiper device comprising a carrier element, as well as a wiper blade which includes opposing longitudinal grooves on its longitudinal sides, in which grooves spaced-apart longitudinal strips of the carrier element are disposed, wherein neighboring ends of the longitudinal strips are interconnected by a respective connecting piece, wherein at least one connecting piece comprises engaging members engaging around the longitudinal strips so that the strips are mounted in grooves formed by the engaging members wherein the strips and the connecting piece are slidably connected by means of a snap connection, wherein the snap connection comprises laterally extending means on the strips, and wherein the laterally extending means comprise at least one protrusion extending laterally from an interior edge of each strip, the protrusion being located within the outer contour of each strip and between stops on the connecting piece, with the special feature that the grooves of the wiper blade each comprise a stop for blocking a longitudinal movement of the wiper blade relative to the strips.

5 Claims, 5 Drawing Sheets

WINDSCREEN WIPER DEVICE

BACKGROUND OF THE INVENTION

1. Technical Field

The invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of the longitudinal strips are interconnected by a respective connecting piece, which windscreen wiper device comprises a connecting device for an oscillating wiper arm, wherein at least one connecting piece comprises engaging members engaging around the longitudinal strips so that the strips are mounted in grooves formed by the engaging members, wherein the strips and the connecting piece are slidably connected by means of a snap connection, wherein the snap connection comprises laterally extending means on the strips, and wherein the laterally extending means comprise at least one protrusion extending laterally from an interior edge of each strip, the protrusion being located within the outer contour of each strip and between stops on the connecting piece.

Such a windscreen wiper device is known from European patent publication no. 1 491 416 of the same Applicant. The prior art windscreen wiper device is in particular designed as a "yokeless" wiper device, wherein use is no longer made of several yokes pivotally connected to each other, but wherein the wiper blade is biased by the carrier element, as a result of which it exhibits a specific curvature.

SUMMARY OF THE INVENTION

In practice it is felt that, although the neighbouring ends of the longitudinal strips and the connecting pieces (in practice also called "end caps") of the prior art windscreen wiper device are connected in a durable, solid manner, the position of the wiper blade between the end caps thereof could be better controlled. Indeed, the tolerance of the rubber material of the wiper blade is a few millimeters and the design of the end caps leave a space of also a few millimeters.

The object of the invention is to improve the prior art as indicated above, in particular to provide a windscreen wiper device, wherein the longitudinal strips and the connecting pieces ("end caps") are interconnected in a durable, solid manner, and wherein the position of the wiper blade is better defined.

In order to accomplish that objective, a windscreen wiper device of the kind referred to in the introduction is characterized in that the grooves of the wiper blade each comprise a stop for blocking a longitudinal movement of the wiper blade relative to the strips. For example, such a stop may be formed by a protrusion extending laterally from an interior longitudinal wall of the wiper blade, located between the two opposing grooves, into a hole comprise an opening at the longitudinal side of a respective strip. Accordingly, the wiper blade is not allowed to move in at least one longitudinal direction with respect to the strips.

In one preferred embodiment of a windscreen wiper device in accordance with the invention the grooves of the wiper blade each comprise at least two opposite stops for blocking opposite longitudinal movements of the strips.

In another preferred embodiment of a windscreen wiper device in accordance with the invention the stop(s) comprise (s) a protrusion extending laterally from a longitudinal wall of the wiper blade located between the two opposing grooves.

In another preferred embodiment of a windscreen wiper device according to the invention the stop(s), is/are made integral with the wiper blade. Particularly, a moulding operation would ensure that the stop(s) can be formed in a reliable and controllable manner, without high costs as far as additional tools and equipment are concerned.

The invention furthermore relates to a method for manufacturing a windscreen wiper device in accordance with the invention, wherein opposing longitudinal grooves are formed in the longitudinal sides of an elongate wiper blade of a flexible material, which can be placed in abutment with a windscreen to be wiped, in which grooves longitudinal strips of a carrier element are subsequently fitted in spaced-apart relationship, wherein neighbouring ends of the longitudinal strips are interconnected by a respective connecting piece, wherein a connecting device is provided for an oscillating wiper arm, wherein the strips at least one connecting piece are slidably connected by means of a snap connection, wherein engaging members of the connecting piece engage around the longitudinal strips, so that the strips are mounted in grooves formed by the engaging members, wherein the snap connection comprises laterally extending means on the strips, and wherein the laterally extending means are provided with at least one protrusion extending laterally from an interior longitudinal edge of each strip, the protrusion being located within the outer contour of each strip and between stops on the connecting piece, characterized in that the grooves of the wiper blade are each provided with a stop for blocking a longitudinal movement in at least one direction of the wiper blade with respect to the strips.

THE DRAWINGS

The invention will now be explained in more detail with reference to figures illustrated in a drawing, wherein.

DETAILED DESCRIPTION

Figure 1:
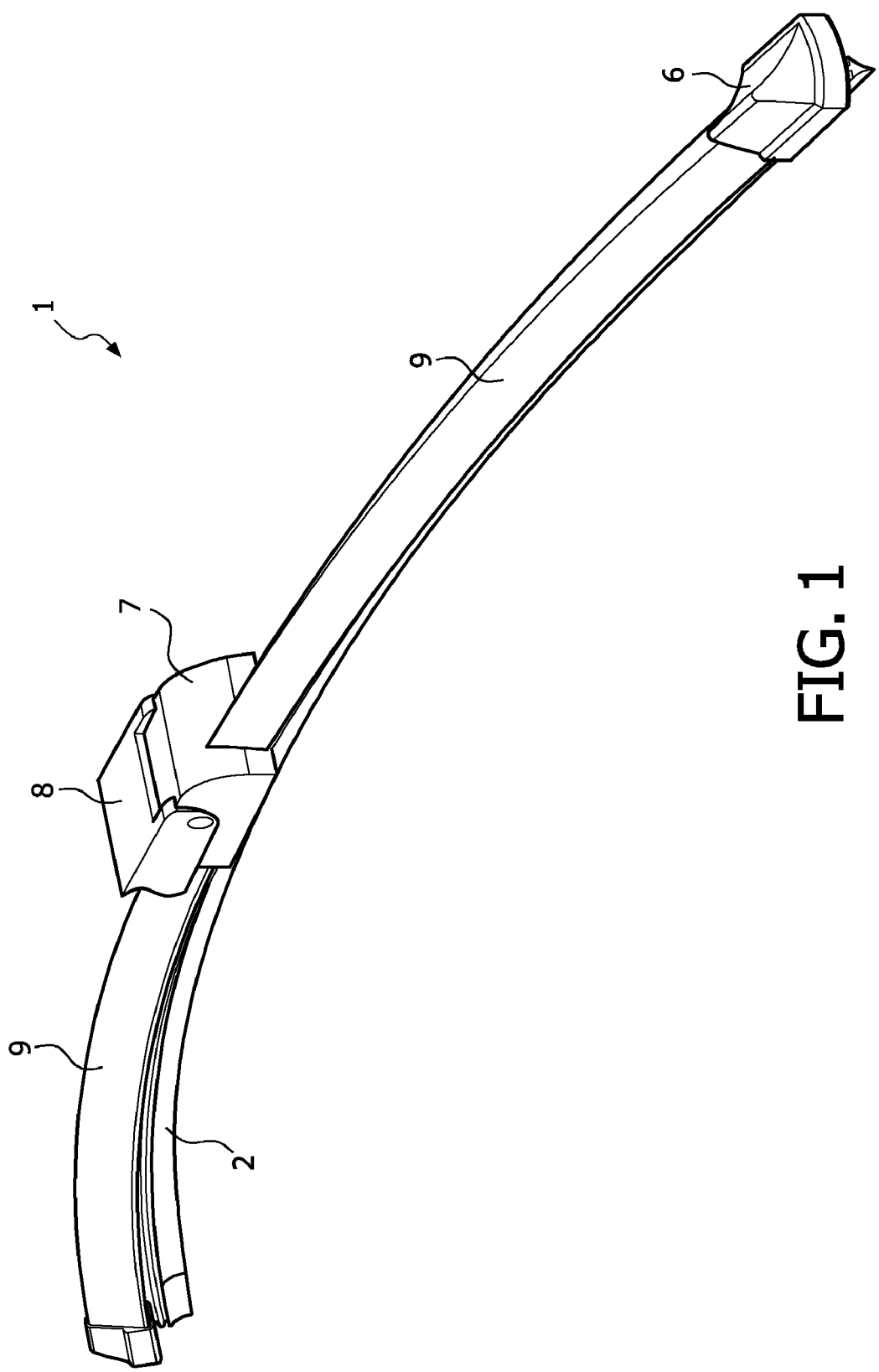
FIG. 1 is a perspective, schematic view of a preferred embodiment of a windscreen wiper device according to the invention.

FIG. 1 shows a preferred variant of a windscreen wiper device 1 according to the invention. The windscreen wiper device is built up of an elastomeric wiper blade 2 (FIG. 2), in the longitudinal sides of which opposing longitudinal grooves 3 are formed, and of longitudinal strips 4 made of spring band steel (FIG. 3), which are fitted in the longitudinal grooves 3. The strips 4 form a flexible carrier element for the rubber wiper blade 2, as it were, which is thus biased in a curved position (the curvature in operative position being that of a windscreen to be wiped). Neighbouring ends 5 of strips 4 are interconnected on either side of the windscreen wiper device 1 by means of plastic connecting pieces 6 being separate constructional elements. The windscreen wiper device 1 is further equipped with a connecting device 7 for an oscillating arm 8, and a spoiler 9.

Figure 4:
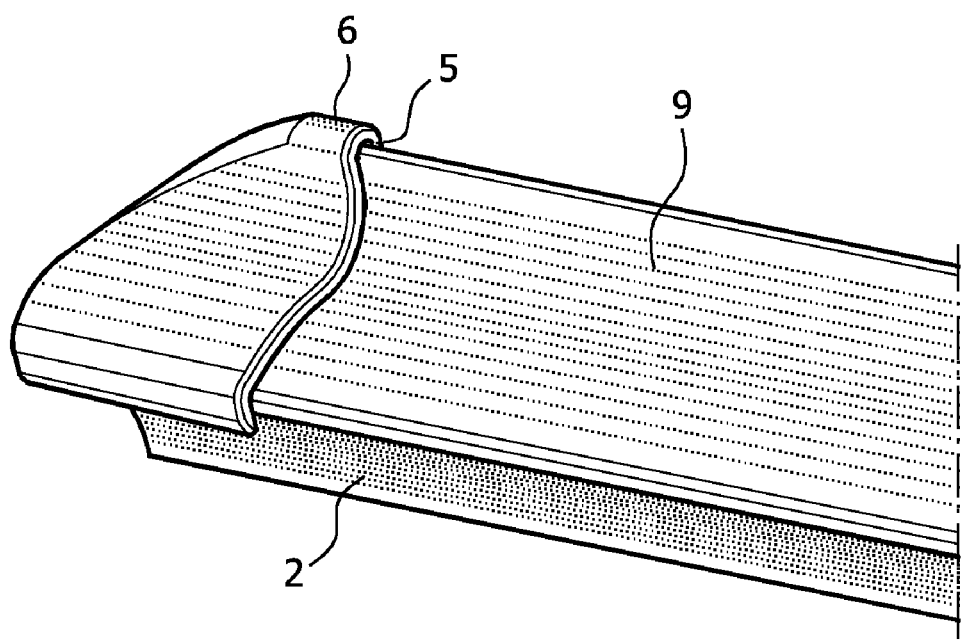
Figure 5:
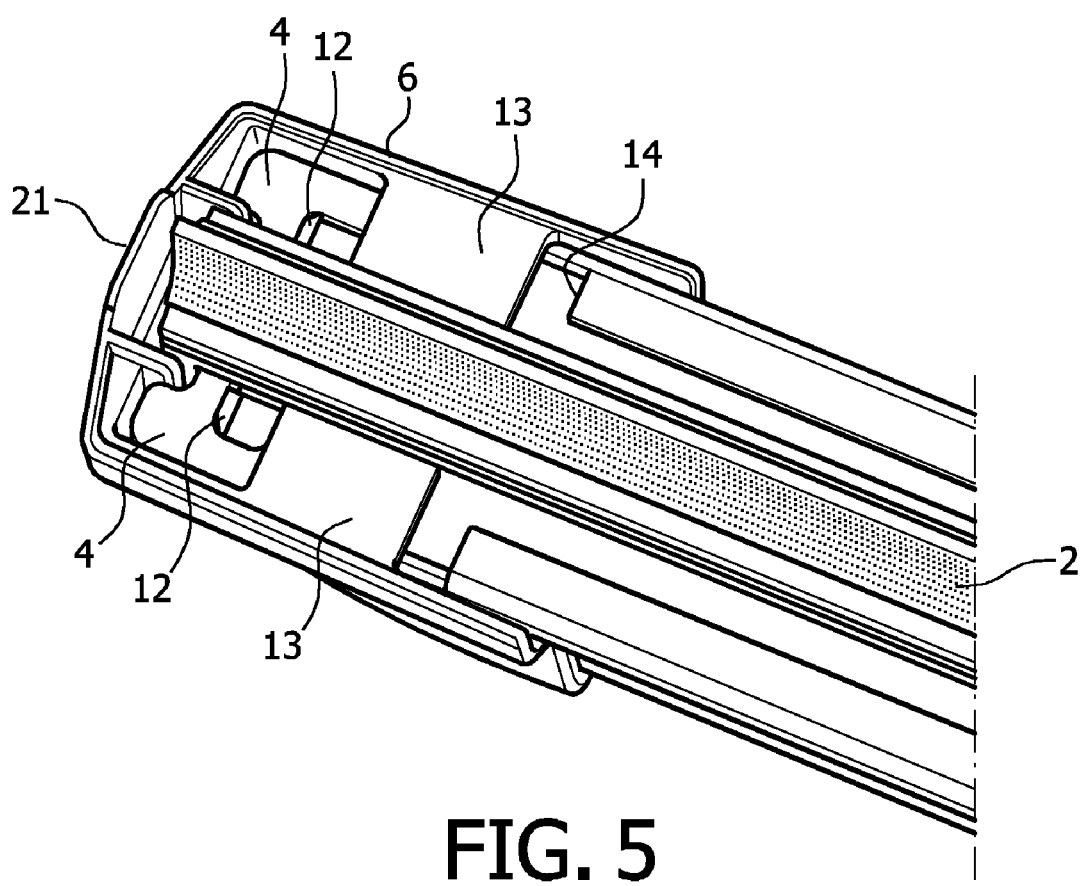

FIG. 4 shows a free end of the windscreen wiper device 1 of FIG. 1, whereas FIG. 5 reveals a bottom view of the free end with the wiper blade 2 being present. FIGS. 4 and 5 show only one free end of the windscreen wiper device 1, as the rubber retention is only on one end of the windscreen wiper device 1, so that the rubber on the other end thereof can slide freely. Corresponding parts have been designated with the same reference numerals.

Figure 3:
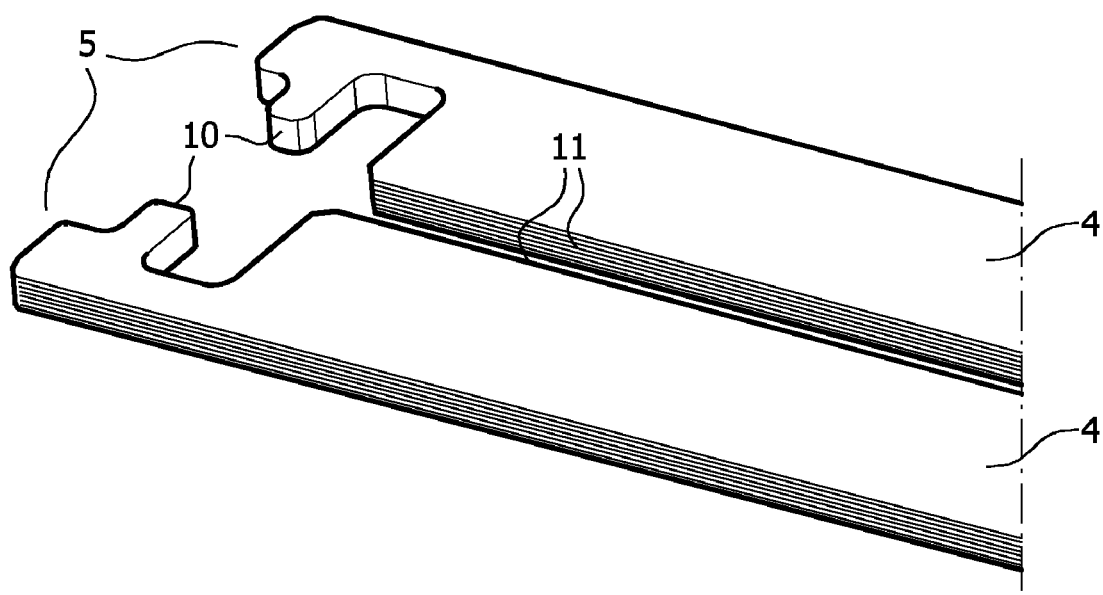

With reference to FIG. 3 relating to a top view of the strips 4 as such, the strips 4 are each provided with a protrusion 10 extending laterally from a longitudinal interior edge 11 of the strips 4. When a connecting piece 6 is slidably mounted onto the neighbouring ends 5 of the strips 4, a snap or clicking connection is realized, wherein the protrusions 10 are snapped or clicked between stops 12 ("notches 12") inside the connecting piece 6. Each protrusion 10 rests in a small groove between these opposing stops 12. Accordingly, the strips 4 are blocked against any movement in longitudinal direction with respect to the connecting pieces 6. Each connecting piece 6 is also provided with two engaging members 13 made integral therewith, wherein the engaging members 13 engage around the strips 4 so as to form a groove 14 for sliding the strips 4 therein. The engaging members 13 ensure that the strips 4 are blocked against any movement in transversal direction with respect to the connecting pieces 6. Each connecting piece 6 has a cavity 15 to accommodate the free end of the spoiler 9. The stop 12 facing away from the free end of the connecting piece 6 is equipped with an inclined upper surface, so that sliding the connecting piece 6 onto the strips 4 does not take too much force, whereas once the protrusion 10 rests inside the groove dismounting the connecting piece 6 from the strips 4 cannot take place easily. The stop 12 facing towards the free end of the connecting piece 6 also ensures that the strips are kept at a mutual constant distance, as the upper end of each strip 4 is located between the stop 12 and a (side) wall of the connecting piece 6. This snap connection as such is described in European patent publication no. 1 491 416 of the same Applicant.

Figure 2:
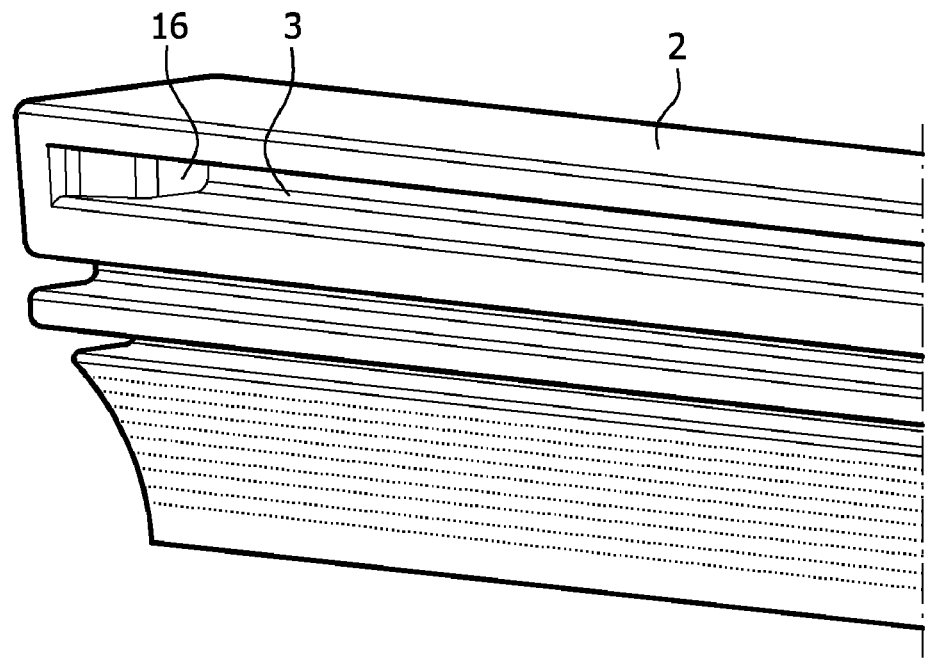
FIGS. 2 through 7 show details of the windscreen wiper device of FIG. 1.
Figure 6A:
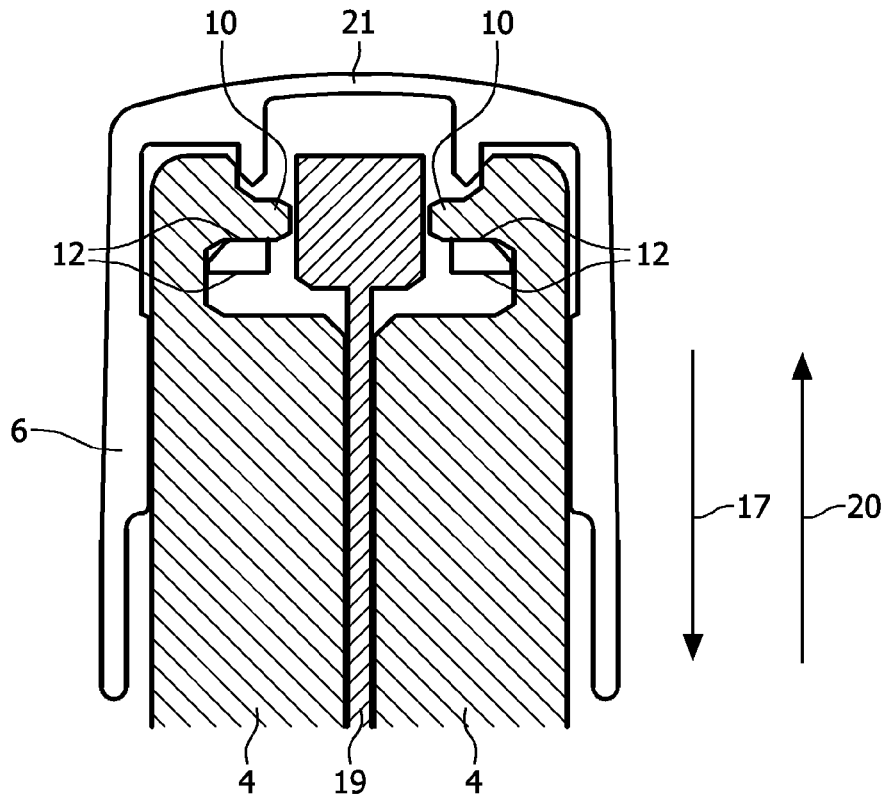
Figure 6B:
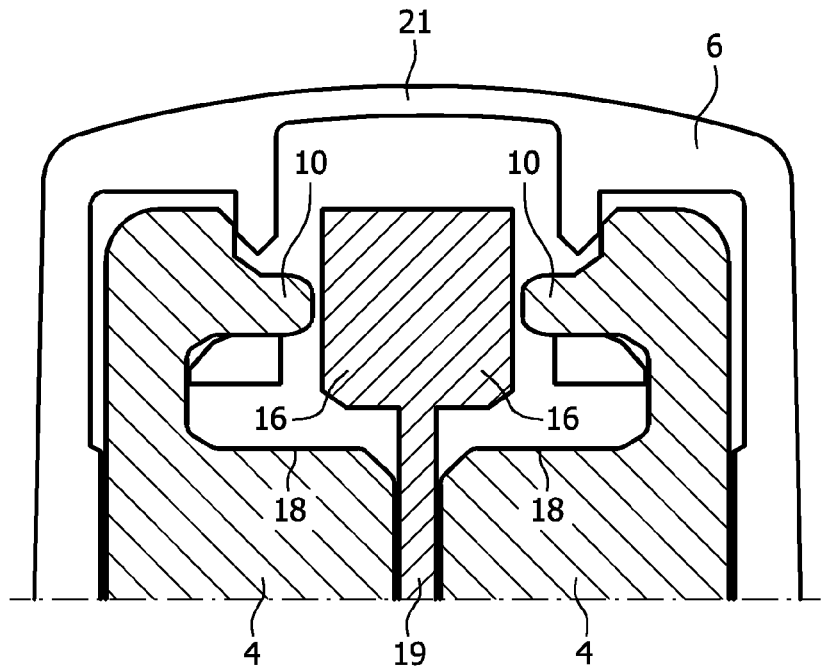

As can be seen from FIGS. 2 and 6, the grooves 3 of the wiper blade 2 each comprise a stop 16 for blocking relative longitudinal movements of the wiper blade (2) vis-à-vis the strips 4 in the direction of the arrow 17. For blocking relative longitudinal movements of the wiper blade (2) vis-à-vis the strips in the (opposite) direction of the arrow 20, the extremity of the wiper blade (2) comes in contact with an end surface 21 of connecting piece 6. The stops 16 can come into contact with transverse sides 18 of the strips 4 thus ensuring that the movement of the wiper blade (2) is blocked. The stops 16 are each formed by a protrusion extending laterally from a longitudinal wall 19 of the wiper blade 2 located between the two opposing grooves 3. The stops 16 are in one piece with the wiper blade 2.

Figure 7:
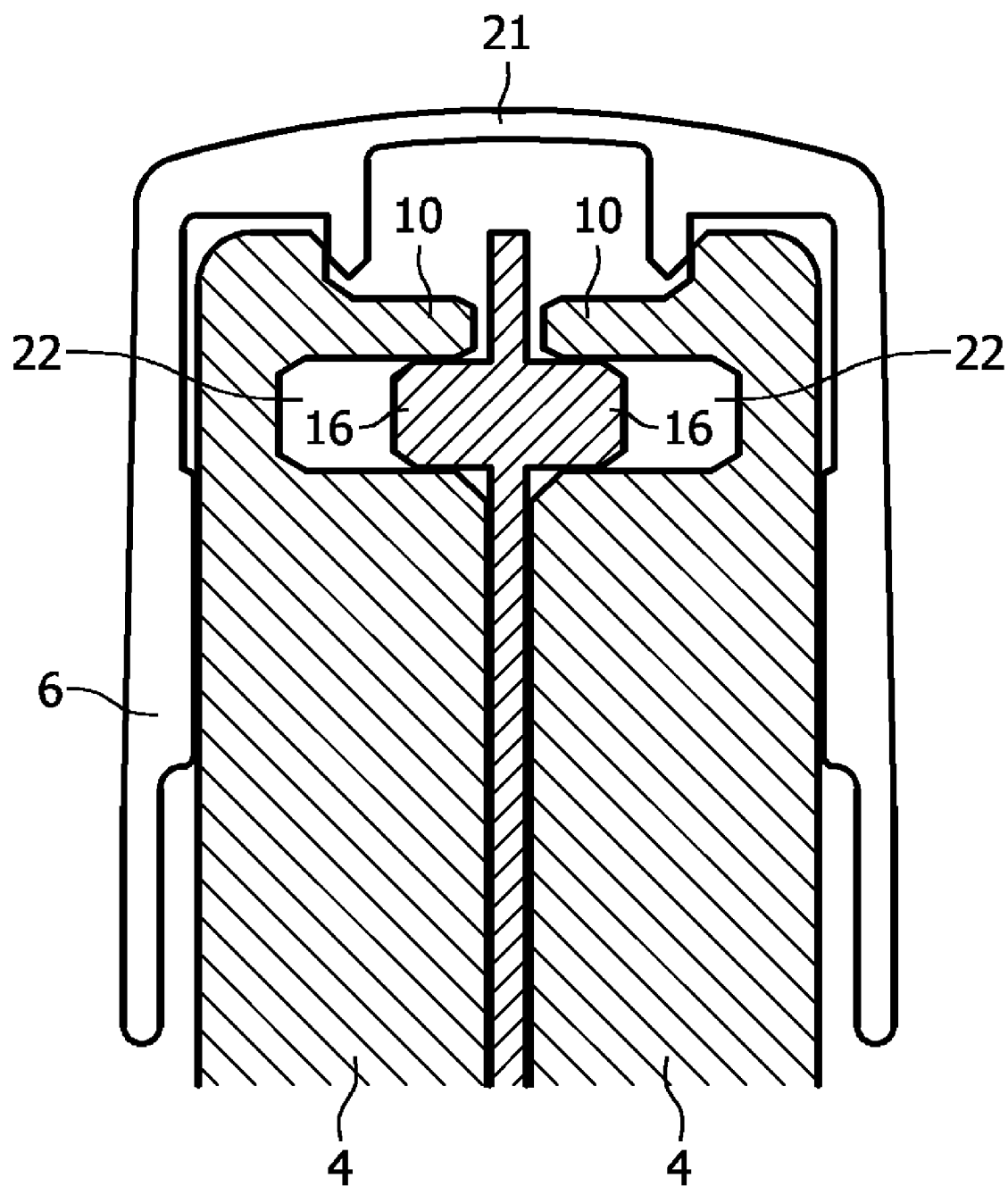

FIG. 7 shows another embodiment of a wiper blade 2, wherein the stops 16 thereof are located in a groove 22 of each strip 4.

The present invention is not limited to the embodiment shown, but extends also to other embodiments falling within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating wiper arm, wherein at least one connecting piece comprises engaging members engaging around the longitudinal strips and said connecting piece is slidably connected by means of a snap connection, wherein the snap connection comprises at least one protrusion extending laterally from an interior edge of each strip, said protrusion being located within the outer contour of each strip and between stops on the connecting piece, wherein the grooves of said wiper blade each comprise a stop for blocking a longitudinal movement of said wiper blade relative to said strips in a first longitudinal direction, wherein the connecting piece is provided with an end surface for blocking a longitudinal movement of said wiper blade relative to said strips in a second longitudinal direction opposite said first longitudinal direction.

2. A windscreen wiper device according to claim 1, wherein the grooves of said wiper blade each comprise at least two opposite stops for blocking opposite longitudinal movements of said strips.

3. A windscreen wiper device according to claim 2, wherein the stops of the wiper blade comprise protrustions extending laterally from a longitudinal wall of said wiper blade located between said two opposing grooves.

4. A windscreen wiper device according to claim 3, wherein said stops of the wiper blade are made integral with said wiper blade.

5. Method for manufacturing a windscreen wiper device, wherein opposing longitudinal grooves are formed in longitudinal sides of an elongate wiper blade of a flexible material, which can be placed in abutment with a windscreen to be wiped, in which grooves longitudinal strips of a carrier element are subsequently fitted in spaced-apart relationship, wherein neighbouring ends of said longitudinal strips are interconnected by a respective connecting piece, wherein a connecting device is provided for an oscillating wiper arm, wherein on said strips at least one connecting piece is slidably connected by means of a snap connection, wherein engaging members of said connecting piece engage around the longitudinal strips so that said strips are mounted in grooves formed by said engaging members, wherein said snap connection comprises at least one protrusion extending laterally from an interior longitudinal edge of each strip, said protrusion being located within the outer contour of each strip and between stops on the connecting piece, wherein the grooves of said wiper blade are each provided with a stop for blocking a longitudinal movement of said wiper blade relative to said strips in a first longitudinal direction, and that the connecting piece is provided with an end surface for blocking a longitudinal movement of said wiper blade relative to said strips in a second longitudinal direction opposite said first longitudinal direction.

* * * * *